United States Patent
Grebe et al.

(10) Patent No.: US 9,039,103 B2
(45) Date of Patent: May 26, 2015

(54) PRESSURE CONTROL VALVE ARRANGEMENT HAVING PRESSURE MEDIUM GUIDING SURFACE INTEGRALLY FORMED ONTO A PROJECTION OF THE COVER

(75) Inventors: Jan Grebe, Starnberg (DE); Dirk Brenner, Stuttgart (DE); Jochen Weippert, Munich (DE); Wolfgang Rohn, Munich (DE); Harald Jaehns, Munich (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 480 days.

(21) Appl. No.: 13/381,048
(22) PCT Filed: Jun. 24, 2010
(86) PCT No.: PCT/EP2010/059020
§ 371 (c)(1),
(2), (4) Date: Apr. 2, 2012
(87) PCT Pub. No.: WO2011/000778
PCT Pub. Date: Jan. 6, 2011

(65) Prior Publication Data
US 2012/0181852 A1  Jul. 19, 2012

(30) Foreign Application Priority Data
Jun. 29, 2009 (DE) .......................... 10 2009 030 900

(51) Int. Cl.
*B60T 8/36* (2006.01)
*B60T 15/02* (2006.01)
(52) U.S. Cl.
CPC ............. *B60T 8/3605* (2013.01); *B60T 15/027* (2013.01)
(58) Field of Classification Search
CPC ..... B60T 15/027; B60T 13/683; B60T 8/361; B60T 8/362; B60T 8/363; B60T 8/3635; B60T 8/364; B60T 8/3645; B60T 8/365
USPC .............. 303/118.1, 119.1, 119.2, 119.3, 56; 137/596.14, 596.16, 596.17
See application file for complete search history.

(56) References Cited

U.S. PATENT DOCUMENTS

| 3,977,734 A | * | 8/1976 | Ronnhult et al. .......... 303/119.3 |
| 4,477,051 A | | 10/1984 | Ben-Yehuda |

(Continued)

FOREIGN PATENT DOCUMENTS

| DE | 38 21 044 | 6/1989 |
| EP | 0 266 555 | 5/1988 |
| FR | 2 444 594 | 12/1979 |

OTHER PUBLICATIONS

Machine Translation of EP 0 266 555.*

(Continued)

*Primary Examiner* — Nicholas J Lane
(74) *Attorney, Agent, or Firm* — Kenyon & Kenyon LLP

(57) ABSTRACT

A pressure control valve arrangement for controlling a fluid pressure in an ABS brake system of a vehicle so that, while there is a tendency of individual wheels of the vehicle to lock, the brake pressure in at least one associated brake cylinder can be adaptively adjusted, including: a housing; and at least one diaphragm valve is accommodated in the housing, the diaphragm valve having a diaphragm as the valve body, which diaphragm can be acted upon by introducing pressure medium into a control chamber that is covered on the outside of the housing by a cover so that the control chamber is formed between the diaphragm and the cover, wherein at least one pressure medium channel carrying pressure medium is formed in the housing in the region of the cover, wherein at least one cover has at least one projection projecting into the pressure medium channel in the housing, a pressure medium guiding surface for directing the flow of the pressure medium carried in the pressure medium channel being formed on the projection.

21 Claims, 3 Drawing Sheets

(56) References Cited

U.S. PATENT DOCUMENTS

| | | | |
|---|---|---|---|
| 6,209,971 B1* | 4/2001 | Ho et al. ............... | 303/119.3 |
| 6,659,129 B1* | 12/2003 | Kiel et al. ............ | 137/596.16 |
| 7,780,245 B2* | 8/2010 | Ho ....................... | 303/119.2 |
| 2011/0132475 A1* | 6/2011 | Eidenschink et al. ... | 137/487.5 |
| 2011/0175440 A1* | 7/2011 | Eidenschink et al. ... | 303/119.1 |
| 2012/0175942 A1* | 7/2012 | Grebe et al. ........... | 303/113.1 |
| 2012/0175943 A1* | 7/2012 | Grebe et al. ........... | 303/113.2 |
| 2012/0175944 A1* | 7/2012 | Grebe et al. ........... | 303/119.1 |
| 2012/0181852 A1* | 7/2012 | Grebe et al. ........... | 303/113.1 |

OTHER PUBLICATIONS

European Patent Office, International Preliminary Report on Patentability, Jan. 12, 2012, from International Patent Application No. PCT/EP2010/059020, filed on Jun. 24, 2012.

European Patent Office, English Translation of International Preliminary Report on Patentability and Written Opinion, Jan. 26, 2012, from International Patent Application No. PCT/EP2010/059020, filed on Jun. 24, 2010.

International Search Report for PCT/EP2010/059020, dated Sep. 1, 2010.

* cited by examiner

PRESSURE CONTROL VALVE ARRANGEMENT HAVING PRESSURE MEDIUM GUIDING SURFACE INTEGRALLY FORMED ONTO A PROJECTION OF THE COVER

FIELD OF THE INVENTION

The present invention relates to a pressure control valve arrangement for controlling the fluid pressure in an ABS brake system of a vehicle in such a way that, while there is a tendency of individual wheels of the vehicle to lock, the brake pressure in at least one associated brake cylinder can be adaptively adjusted, wherein at least one diaphragm valve is accommodated in a housing of the pressure control valve arrangement, the diaphragm valve having a diaphragm as the valve body, which diaphragm can be acted upon by introducing pressure medium into a control chamber that is covered on the outside of the housing by a cover in such a way that the control chamber is formed between the diaphragm and the cover, and wherein at least one pressure medium channel carrying pressure medium is formed in the housing in the region of the cover, in accordance with the features described herein.

BACKGROUND INFORMATION

ABS (antilock brake system) prevents wheels from locking and comes into operation when a higher friction coefficient between a tire and the road is demanded than can be transmitted, i.e. when the driver brakes too hard. In the case of excessively hard braking, the central electronic control unit of the ABS brake system detects the tendency for one or more wheels to lock from rotational speed detector signals and, from these signals, calculates the activation of the pressure control valve arrangement acting on the associated brake cylinder. The brake pressure is then adjusted to an optimum slip of the pressure control valve arrangement, which lowers, holds or builds up the pressure in accordance with the wheel behavior and hence with the friction conditions between the tire(s) and the road.

ABS pressure control valve arrangements without a relay action, to which the exemplary embodiments and/or exemplary methods of the present invention relate, are used on vehicles such as commercial vehicles, buses, semitrailer trucks and trailers. Pressure control valve arrangements without a relay action generally have 3/2-way solenoid valves as pilot control valves for diaphragm valves, wherein an electronic control device activates the 3/2-way solenoid valves to enable the functions required for ABS operation, "pressure holding", "pressure reduction" and "pressure buildup", to be carried out. During a braking operation which does not involve a response by the ABS (no tendency for a wheel to lock), the pressure medium, generally air, flows through the pressure control valve arrangements unhindered in both directions during air admission to and venting from the brake cylinders. This ensures that the operation of the service brake system is not affected by the ABS pressure control valve arrangement.

Within the housing, pressure control valves of the type in question in the form of single-channel pressure control valves for antilock systems of motor vehicles have respective diaphragm valves as a holding valve and an outlet valve and respective solenoid control valves for the holding valve and the outlet valve. The two diaphragm valves each contain a diaphragm, which can be acted upon by the pressure in a control chamber, wherein the control chamber is closed off from the outside by a cover secured on the housing.

A pressure control valve arrangement of the type in question for an ABS brake system is known from EP 0 266 555 A1, for example. In the prior-art pressure control valve arrangements, the two diaphragm valves are generally arranged on the side of the housing, wherein the corresponding pilot control spaces are closed off by covers secured on the side of the housing. These covers are produced by primary forming processes such as injection molding. Pressure medium channels are furthermore formed in the housing in order to carry pressure medium within the housing to and from the various connections of the pressure control valve arrangement and to and from the diaphragm valves and to and from the solenoid valves controlling the above valves.

The pressure medium channels may run in a vertical and/or horizontal direction within the housing because then the housing does not have to be re-clamped during the machining of the pressure medium channels of a machining center, for example. A change in the direction of such a pressure medium channel is problematic in terms of flow engineering because the deflection of the flow in the pressure medium channel concerned is then generally 90 degrees (deflection from the vertical to the horizontal or vice versa) and this results in relatively high flow losses due to the abrupt deflection in such a pressure medium channel elbow. However, because a high dynamic response is required in pressure control valve arrangements for ABS/ASR systems and as rapid as possible venting of the brake cylinder concerned is required, for example, in the context of the "pressure lowering" function when the permissible wheel slip is exceeded, such flow losses caused by deflections must be kept as small as possible.

Because the installation dimensions of such a pressure control valve arrangement, especially the installation width thereof, are standardized and invariable owing to restricted space conditions, a solution to this problem cannot consist in enlarging the flow cross sections of the pressure medium channels.

Given this situation, it is the underlying object of the invention to develop a pressure control valve arrangement of the type mentioned at the outset in such a way that the flow losses or flow resistance, especially in pressure medium channels deflecting a pressure medium flow, are reduced. At the same time, the outlay on the production and finishing of the manner for achieving this object should be as low as possible.

SUMMARY OF THE INVENTION

According to the present invention, this object may be achieved by the features described herein.

The exemplary embodiments and/or exemplary methods of the present invention provide that at least one cover has at least one projection projecting into the pressure medium channel in the housing, a pressure medium guiding surface for directing the flow of the pressure medium carried in the pressure medium channel being formed on the projection.

Since such a cover is present in any case for the purpose of covering and/or sealing off a control chamber of a diaphragm valve of the pressure control valve arrangement and, according to an additional function, it is now also the carrier of a projection with a pressure medium guiding surface which guides the flow or, in the case of a deflection, deflects the flow, it advantageously performs a dual function in a single component.

In this case, the flow-guiding or flow-deflecting pressure medium guiding surface of the projection projecting into the pressure medium channel is advantageously configured in such a way that the flow losses or flow resistance of the pressure medium channel concerned, excluding the surface in the pressure medium channel, is/are reduced.

Owing to the reduced flow resistance, the pressure control valve arrangement consequently has an improved dynamic response without a change in the flow cross section of the pressure medium channel concerned, and this has a positive effect in terms of the required rapid succession of pressure reduction, pressure holding and pressure increasing phases.

Advantageous developments and improvements of the exemplary embodiments and/or exemplary methods of the present invention indicated herein are possible of the measures presented in the further description herein.

The projection having the pressure medium guiding surface may project into the pressure medium channel at a location at which deflection of the flow of the pressure medium within the pressure medium channel from a section of the pressure medium channel which leads in one direction into a section of the pressure medium channel which leads in another direction is envisaged. In order to achieve this, one or the other section of the pressure medium channel can, for example, extend as far as an aperture in a side face of the housing, into which opening the projection of the cover then projects in the manner of a spigot.

The deflection of the flow of the pressure medium within the pressure medium channel may be substantially 90 degrees, wherein the pressure medium guiding surface of the projection is designed to deflect the flow of the pressure medium from one direction to the other.

According to a development, the pressure medium channel is a vent channel, which carries compressed air from a diaphragm valve designed as an outlet valve to a vent of the pressure control valve arrangement. In this case, a central area of the cover may serve to cover the control chamber of the diaphragm valve designed as an outlet valve, and the at least one projection having the pressure medium guiding surface is formed at the edge of a nose of the cover.

If the cover provided with the projection and the pressure medium guiding surface is designed as an integral injection molding made of plastic or metal, production and assembly costs are advantageously low.

Further measures that improve the exemplary embodiments and/or exemplary methods of the present invention are explained in greater detail below together with the description of an embodiment of the invention with reference to the drawings.

DETAILED DESCRIPTION

Figure 1:
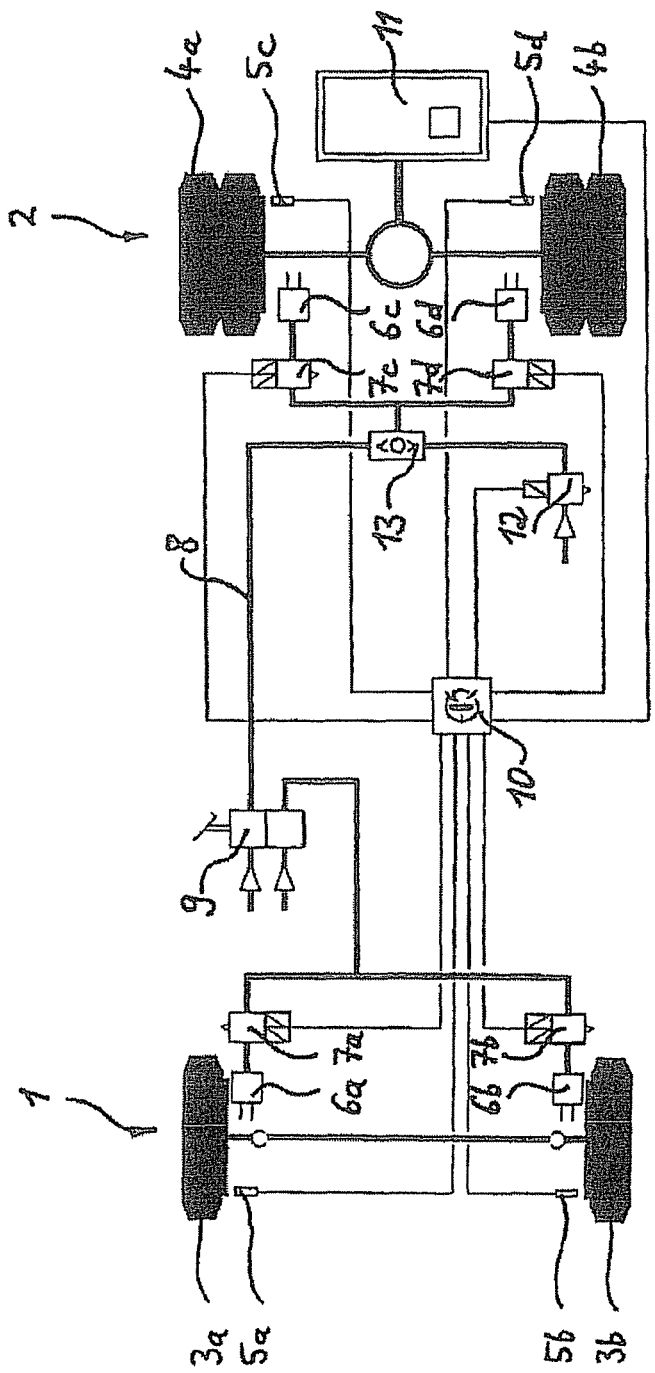
FIG. 1 shows a diagrammatic representation of an ABS brake system as a general layout of a four-sensor/4-channel ABS brake system of a vehicle.

According to FIG. 1, a vehicle fitted with an ABS brake system has a front axle 1 and a rear axle 2. Wheels 3a and 3b are arranged on the front axle 1; the rear axle 2 has wheels 4a and 4b, each fitted with twin tires, for example. In this case, the ABS brake system used to brake these wheels 3a, 3b and 4a, 4b is in the form of a four-sensor/4-channel system. This means that, in this case, a total of four rotational speed sensors 5a-5b and four pressure control valve arrangements 7a-7d are available. The pressure control valve arrangements 7a-7d are used to control respectively associated brake cylinders 6a-6d. All the pressure control valve arrangements 7a-7d are connected to a foot brake valve 9 by a branching pneumatic brake pressure line 8.

In actuating the foot brake valve 9, the driver generates a brake pressure, which, passing through the pressure control valve arrangements 7a-7d via the pneumatic brake pressure line 8, is transmitted to the brake cylinders 6a-6d associated with wheels 3a, 3b and wheels 4a, 4b.

Figure 2A:
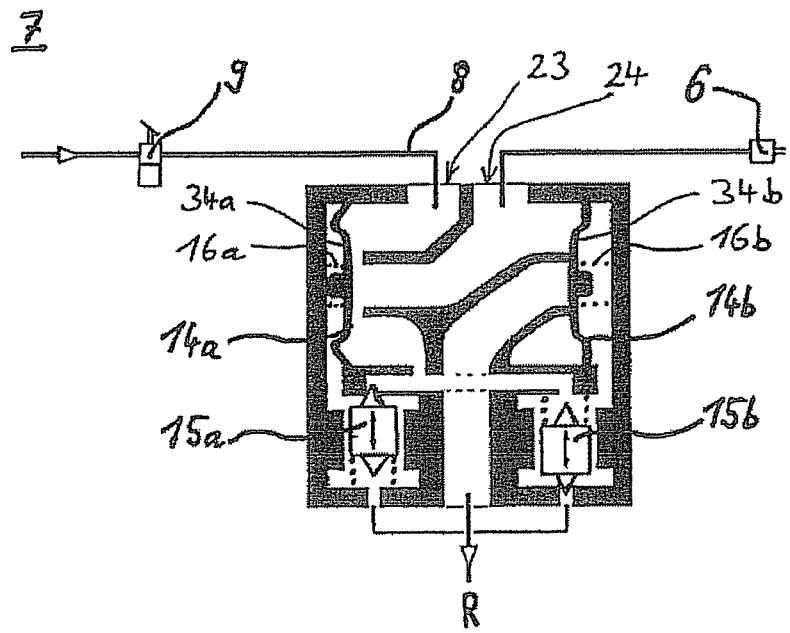
FIG. 2a shows a schematic representation of a pressure control valve arrangement which controls a brake cylinder, in the open state (pressure buildup).
Figure 2B:
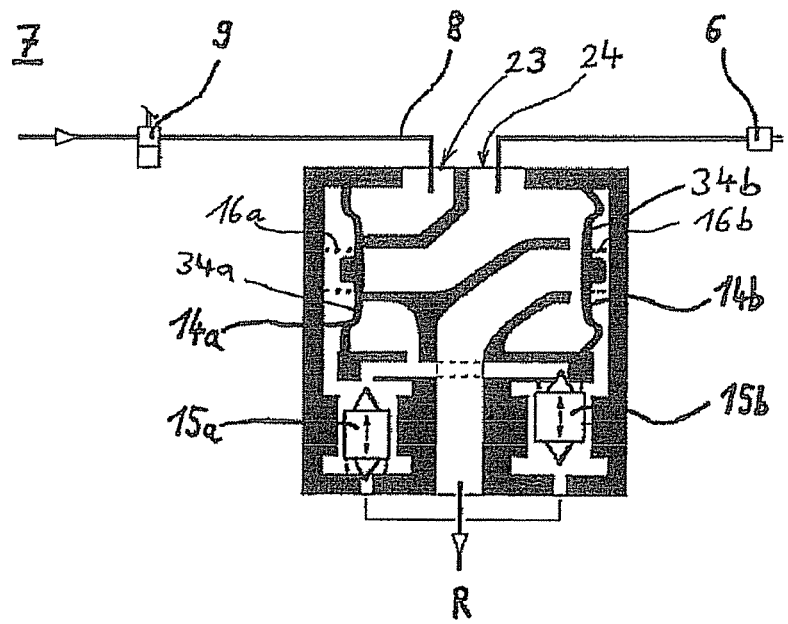
FIG. 2b shows a schematic representation of the pressure control valve arrangement in FIG. 2a in the closed state (pressure reduction).
Figure 4:
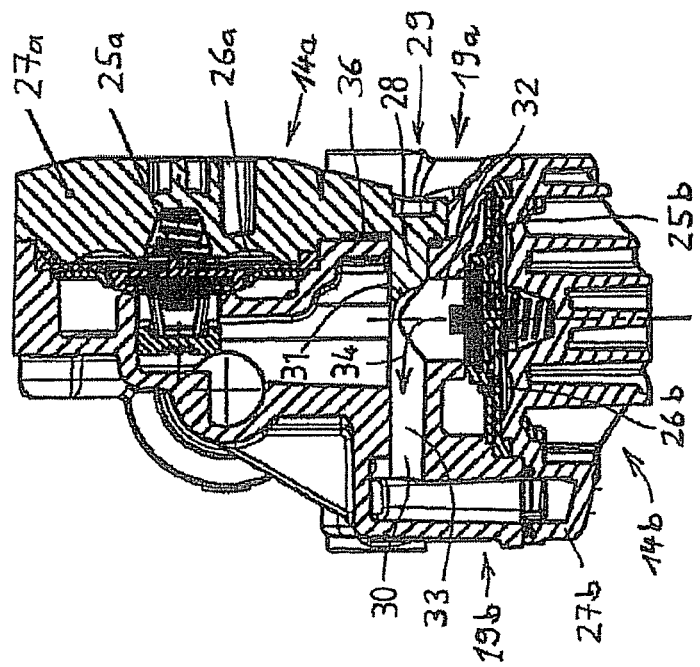
FIG. 4 shows a sectional representation along the line IV-IV in FIG. 3.

The pressure control valve arrangements 7a-7d can be activated by integrated solenoid valves 15a, 15b, shown in FIG. 2a, FIG. 2b and FIG. 4, and, for this purpose, are connected electrically to a central electronic control unit 10. On the input side, the electronic control unit 10 is connected to the four rotational speed sensors 5a-5b that detect the wheel speeds. If a wheel 3a-3d locks, the brake pressure input by the driver via the foot brake valve 9 is reduced by the corresponding pressure control valve arrangement 7a-7d in an ABS control operation under the command of the electronic control unit 10 until locking has been eliminated. The ABS brake system in the embodiment under consideration furthermore comprises an ASR function, which comprises an ASR unit 11 for reducing the engine torque, an ASR solenoid valve 12 and a shuttle valve 13.

Here, the pressure control valve arrangement 7 used for the purpose of ABS control as part of the ABS brake system in accordance with FIG. 2a is constructed in the manner of a single-channel pressure control valve arrangement and essentially comprises two integrated diaphragm valves 14a and 14b and two spring-loaded solenoid valves 15a, 15b, which control the diaphragm valves. The diaphragm valves 14a and 14b are each biased in the closing direction by spring elements 16a, 16b and are pilot-controlled of the respectively associated solenoid valves 15a and 15b.

In FIG. 2a, the pressure control valve arrangement 7 is shown in the open position thereof, in which a pressure buildup to the connected brake cylinder 6 takes place. In this case, neither of the solenoid valves 15a and 15b is electrically activated. In the position shown, the compressed air coming from the foot brake valve 9 pushes open diaphragm valve 14a, which is designed as an inlet valve. The normally closed solenoid valve 15a prevents the associated diaphragm valve 14a from being closed again. Via the normally open second solenoid valve 15b, the brake pressure coming from the foot brake valve 9 closes the second diaphragm valve 14b, which serves as an outlet valve. The compressed air thus passes unhindered through the pressure control valve arrangement 7. The pressure control valve arrangement 7 is in this state also when there is no ABS control taking place.

To hold the brake pressure constant in a brake cylinder 6a to 6d, all that is required is to energize solenoid valve 15a, as a result of which the valve opens and, as a consequence, the brake pressure coming from the foot brake valve 9 pushes shut the inlet-side diaphragm valve 14a. The pressure on the right hand side and the left hand side of diaphragm valve 14a is now equal. However, since the effective area on the left hand side of diaphragm valve 14a is larger, diaphragm valve 14a is closed. The same applies to the outlet-side diaphragm valve 14b controlled by solenoid valve 15b. To hold the pressure constant, the pressure control valve arrangement 7 thus closes the pneumatic brake pressure line 8 running from the foot brake valve 9 to the brake cylinder 6.

According to FIG. 2b, a pressure reduction in a brake cylinder 6a to 6d is achieved by energizing both solenoid valves 15a and 15b. The statements made above on maintaining the pressure apply to solenoid valve 15a and the associated inlet-side diaphragm valve 15a. The other solenoid valve 15b, on the other hand, is closed due to energization. The pressure coming from the brake cylinder 6 therefore pushes the outlet-side diaphragm valve 14b open, and the brake cylinder 6 is vented.

The above-described functions of the pressure control valve arrangement 7 are carried out in the manner described at the outset as part of an ABS/ASR control operation under the command of the electronic control unit 10.

Figure 3:
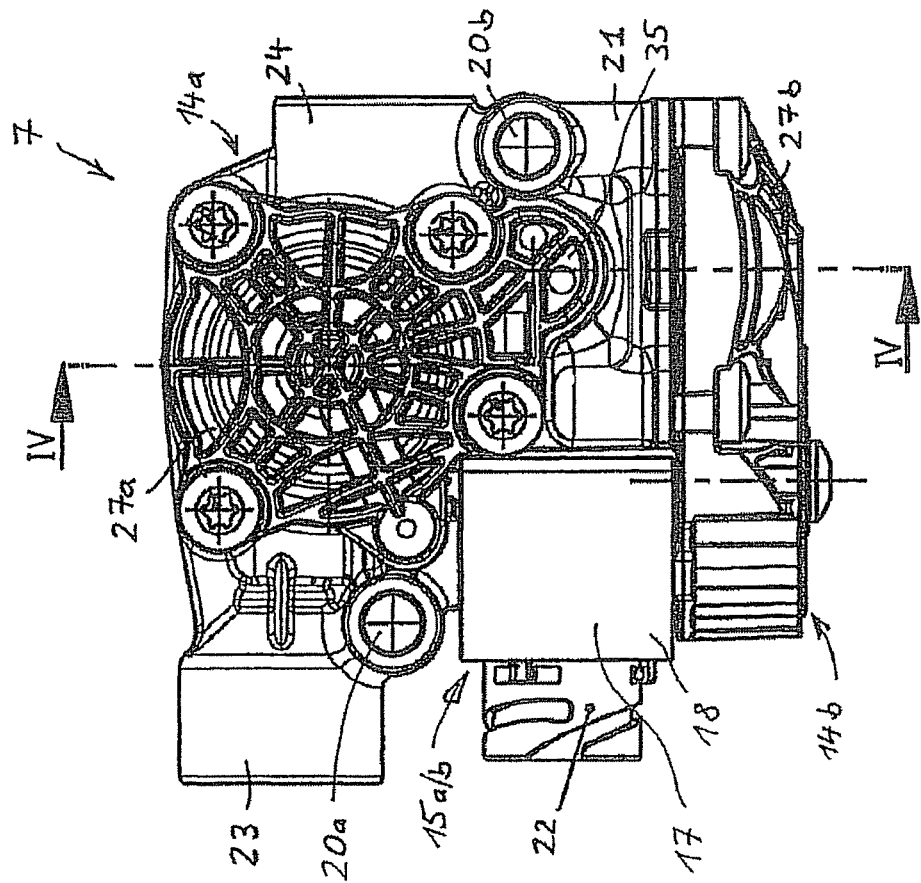
FIG. 3 shows a side view of a specific embodiment of the pressure control valve arrangement in FIG. 2a and FIG. 2b in accordance with an exemplary embodiment of the invention.

In FIG. 3 and FIG. 4, the pressure control valve arrangement 7 illustrated only schematically in FIG. 2a and FIG. 2b is shown in a specific embodiment in the installed position, i.e. the components described above are at the top. In this embodiment, the two solenoid valves 15a, 15b for pilot control of the diaphragm valves 14a, 14b are combined in a dual solenoid valve, although it operates in a manner similar to individual valves 15a, 15b.

The two solenoid valves 15a, 15b have a double magnet 18 housed in a block 17, having two magnet coils, which interact with two solenoid valve seats. Magnet armatures, which interact with the solenoid valve seats of the solenoid valves 15a, 15b and are not shown explicitly here, are operated as valve closing members by energizing the magnet coils.

The block 17 surrounding the double magnet 18 is secured on a housing 21 of the pressure control valve arrangement 7, which may be on the front side, and has a plug connection 22 for supplying power to the double magnet 18. This housing 21 furthermore has a pressure medium connection 23 for supplying pressure to and/or relieving pressure from the pressure control valve arrangement 7, and a working connection 24 for connection of the brake cylinder 6 (FIG. 3).

As FIG. 2a and FIG. 2b show, the pressure medium connection 23 is connected to the foot or service brake valve 9 of the fluid-pressure-actuated braking device by the brake pressure line 8 and is supplied with air or vented in accordance with an actuation of the foot brake valve 9.

As is apparent especially from FIG. 3, the housing 21 is provided with at least one and, in this case, for example, two through holes 20a, 20b opening into both side faces 19a, 19b of the housing 21, through which holes holding arrangements, e.g. screws, for holding the pressure control valve arrangement on a support, e.g. on a chassis of the vehicle, project. The center lines of the two through holes 20a, 20b may be parallel to each other. The axial length of the through holes 20a, 20b applies as a standardized installation dimension of the pressure control valve arrangement 7 and, for reasons of space, is fixed and invariable, defining the maximum permissible width B of the housing 21.

One diaphragm valve 14a may be arranged on the side of the housing 21, and the other diaphragm valve 14b may be arranged on the bottom of the housing 21, as FIG. 4 shows. As a valve body, a diaphragm valve 14a, 14b of this kind has a diaphragm 25a, 25b, which can be acted upon by introducing pressure medium into a control chamber 26a, 26b, each of which is covered on the outside of the housing by a cover 27a, 27b produced by a primary forming process, such as injection molding, which is secured on the housing 21. In this arrangement, the control chamber 26a, 26b is formed between the diaphragm 25a, 25b and the cover 27a, 27b.

As is apparent especially from FIG. 4, the cover 27a closing the control chamber 26a of the diaphragm valve 14a arranged on the side has a projection or spigot 28 which projects from the outside into an aperture 29 of a pressure medium channel 30 in the housing. A pressure medium guiding surface 31 for directing the flow of the pressure medium carried in the pressure medium channel 30 is formed on the projection 28.

The pressure medium channel 30 may be intended to bring about deflection of the flow of the pressure medium from an upstream part of the pressure medium channel 30, which leads in one direction, into a downstream part of the pressure medium channel 30, which leads in another direction.

In the exemplary embodiment, for example, the pressure medium channel 30 brings about a 90-degree deflection of the flow of the pressure medium from a first section 32 of the pressure medium channel 30, the section being vertical in FIG. 4 and having a flow connection to a valve seat of the diaphragm valve 14a acting as an outlet valve, the control chamber 26a of which is covered by the cover 27a, into a section 33 of the pressure medium channel 30, the section being horizontal in FIG. 4 and having a flow connection to a vent connection (not explicitly visible here) formed on the housing 21, as the arrow 34 in FIG. 4 symbolizing the direction of flow illustrates.

As seen from the interior of the housing 21, the horizontal section 33 of the pressure medium channel is extended as far as the aperture 29 in the side face 19a of the housing 21. The projection 28 of the cover 27a projects into this aperture 29 in the manner of a spigot.

In the present case, the pressure medium channel 30 therefore may be a vent channel, which carries compressed air from the working connection 24, which is connected to a brake cylinder, via the outlet valve embodied as a diaphragm valve 14a, to a vent of the pressure control valve arrangement 7.

The pressure medium guiding surface 31 of the projection 28 is designed to deflect the flow of the pressure medium from one direction (in this case the vertical direction) to the other (in this case the horizontal direction) or to assist such a deflection, which may be by a spherical surface.

In a particular embodiment, the cover 27a provided with the projection 28 and the pressure medium guiding surface 31 is designed as an integral injection molding made of plastic or metal.

In a particular embodiment, the central area of the cover 27a serves to cover the control chamber 26a, and the projection 28 having the pressure medium guiding surface 31 is formed at the edge of the cover 27a, e.g. on a nose 35 of the cover 27a, as illustrated by FIG. 3. A corresponding seal 36 in the region of the aperture 29 ensures that the pressure medium channel 30 is sealed off from the outside.

A cover 27a having a projection 28 and a pressure medium guiding surface 31 is not necessarily restricted to use for a pressure medium channel 30 having a 90-degree deflection of the direction of flow. On the contrary, such a cover 27a can be used for any kind of pressure medium channel 30, especially for those without flow deflection, in which a reduction in the flow resistance can be achieved by a pressure medium guiding surface.

LIST OF REFERENCE SIGNS

1 front axle
2 rear axle
3 wheel
4 wheel
5 rotational speed sensor
6 brake cylinder 7 pressure control valve arrangement
8 brake pressure line
9 foot brake valve
10 control unit
11 ASR unit
12 ASR solenoid valve
13 shuttle valve
14 a/b diaphragm valve
15 a/b solenoid valve
16 a/b spring element
17 block
18 double magnet
19 a/b side face
20 a/b through hole
21 housing
22 plug connection
23 pressure medium connection
24 working connection
25 a/b diaphragm
26 a/b control chamber
27 a/b cover
28 projection
29 aperture
30 pressure medium channel
31 pressure medium guiding surface
32 section
33 section
34 arrow
35 nose
36 seal

The invention claimed is:

1. A pressure control valve arrangement for controlling a fluid pressure in an ABS brake system of a vehicle so that, while there is a tendency of individual wheels of the vehicle to lock, the brake pressure in at least one associated brake cylinder can be adaptively adjusted, comprising:
a housing; and
at least one diaphragm valve is accommodated in the housing, the diaphragm valve having a diaphragm as a valve body, which diaphragm is acted upon by introducing a pressure medium into a control chamber that is covered on an outside of the housing by a cover so that the control chamber is formed between the diaphragm and the cover, wherein at least one pressure medium channel carrying the pressure medium is formed in the housing in a region of the cover, wherein integrated in the cover is at least one projection projecting into the pressure medium channel in the housing, a pressure medium guiding surface for directing a flow of the pressure medium carried in the pressure medium channel being formed on the projection;
wherein the projection having the pressure medium guiding surface projects into the pressure medium channel at a location at which the directing of the flow of the pressure medium within the pressure medium channel from a section of the pressure medium channel which leads in one direction into a section of the pressure medium channel which leads in another direction.

2. The pressure control valve arrangement of claim 1, wherein at least one section of the pressure medium channel extends as far as an aperture in a side face of the housing, and wherein the projection of the cover projects into the aperture.

3. The pressure control valve arrangement of claim 1, wherein the directing of the flow of the pressure medium within the pressure medium channel is substantially 90 degrees.

4. The pressure control valve arrangement of claim 1, wherein the pressure medium guiding surface of the projection is configured to provide the directing of the flow of the pressure medium from the one direction to the another direction.

5. The pressure control valve arrangement of claim 1, wherein the pressure medium channel is a vent channel, which carries compressed air from the diaphragm valve configured as an outlet valve to a vent of the pressure control valve arrangement.

6. The pressure control valve arrangement of claim 5, wherein a central area of the cover serves to cover the control chamber of the diaphragm valve configured as an outlet valve, and the at least one projection having the pressure medium guiding surface is formed at an edge of a nose of the cover.

7. The pressure control valve arrangement of claim 1, wherein the cover provided with the projection and the pressure medium guiding surface is configured as an integral injection molding made of plastic or metal.

8. The pressure control valve arrangement of claim 1, wherein at least one electromagnetic control valve, which can be controlled by an electronic control device, is provided for pilot control of the diaphragm valve.

9. A brake-slip-controlled and fluid-pressure-actuated braking device for a vehicle, comprising:
at least one pressure control valve arrangement for controlling a fluid pressure in an ABS brake system of a vehicle so that, while there is a tendency of individual wheels of the vehicle to lock, the brake pressure in at least one associated brake cylinder can be adaptively adjusted, including:
a housing; and
at least one diaphragm valve is accommodated in the housing, the diaphragm valve having a diaphragm as a valve body, which diaphragm can be acted upon by introducing a pressure medium into a control chamber that is covered on the outside of the housing by a cover so that the control chamber is formed between the diaphragm and the cover, wherein at least one pressure medium channel carrying the pressure medium is formed in the housing in the region of the cover, wherein integrated in the cover is at least one projection projecting into the pressure medium channel in the housing, a pressure medium guiding surface for directing the flow of the pressure medium carried in the pressure medium channel being formed on the projection;
wherein the projection having the pressure medium guiding surface projects into the pressure medium channel at a location at which the directing of the flow of the pressure medium within the pressure medium channel from a section of the pressure medium channel which leads in one direction into a section of the pressure medium channel which leads in another direction.

10. The braking device of claim 9, wherein at least one of the sections of the pressure medium channel extends as far as an aperture in a side face of the housing, and wherein the projection of the cover projects into the aperture.

11. The braking device of claim 9, wherein the directing of the flow of the pressure medium within the pressure medium channel is substantially 90 degrees.

12. The braking device of claim 9, wherein medium guiding surface of the projection is configured to provide the directing of the flow of the pressure medium from the one direction to the another direction.

13. The braking device of claim 9, wherein the pressure medium channel is a vent channel, which carries compressed air from the diaphragm valve configured as an outlet valve to a vent of the pressure control valve arrangement.

14. The braking device of claim 13, wherein a central area of the cover serves to cover the control chamber of the diaphragm valve configured as an outlet valve, and the at least one projection having the pressure medium guiding surface is formed at an edge of a nose of the cover.

15. The braking device of claim 9, wherein the cover provided with the projection and the pressure medium guiding surface is configured as an integral injection molding made of plastic or metal.

16. The braking device of claim 9, wherein at least one electromagnetic control valve, which can be controlled by an electronic control device, is provided for pilot control of the diaphragm valve.

17. The braking device of claim 9, wherein at least one of the sections of the pressure medium channel extends as far as an aperture in a side face of the housing, wherein the projection of the cover projects into the aperture, wherein the directing of the flow of the pressure medium within the pressure medium channel is substantially 90 degrees, and wherein the pressure medium guiding surface of the projection is configured to provide the directing of the flow of the pressure medium from the one direction to the another direction.

18. The braking device of claim 17, wherein the pressure medium channel is a vent channel, which carries compressed air from the diaphragm valve configured as an outlet valve to a vent of the pressure control valve arrangement.

19. The braking device of claim 18, wherein a central area of the cover serves to cover the control chamber of the diaphragm valve configured as an outlet valve, and the at least one projection having the pressure medium guiding surface is formed at an edge of a nose of the cover.

20. The braking device of claim 17, wherein the cover provided with the projection and the pressure medium guiding surface is configured as an integral injection molding made of plastic or metal.

21. The braking device of claim 17, wherein at least one electromagnetic control valve, which can be controlled by an electronic control device, is provided for pilot control of the diaphragm valve.

* * * * *